(12) United States Patent
Chu et al.

(10) Patent No.: US 6,578,984 B2
(45) Date of Patent: Jun. 17, 2003

(54) CIRCUIT BOARD INDICATOR

(75) Inventors: Chien Chung Chu, Taipei Hsien (TW); Wen Ching Wu, Taipei Hsien (TW); Chun Jen Chen, Taipei Hsien (TW); Long Kuan Lee, Taipei Hsien (TW); Yu Chin Yu, Taipei Hsien (TW)

(73) Assignee: Lite-On Electronics, Inc., Taipei Hsien (TW)

( * ) Notice: Subject to any disclaimer, the term of this patent is extended or adjusted under 35 U.S.C. 154(b) by 0 days.

(21) Appl. No.: 09/962,121

(22) Filed: Sep. 26, 2001

(65) Prior Publication Data

US 2003/0058642 A1 Mar. 27, 2003

(51) Int. Cl.[7] ................................................. F21V 1/00
(52) U.S. Cl. .................. 362/240; 362/238; 362/362; 362/800; 362/252; 362/253; 362/361; 340/366 R; 340/366; 361/704
(58) Field of Search ................................ 362/240, 238, 362/362, 800, 253, 361, 249, 226, 252, 382, 396; 340/366 R, 366 E, 381; 361/704, 690, 694, 695

(56) References Cited

U.S. PATENT DOCUMENTS 4,206,493 A * 6/1980 Towne et al. ................ 116/202
6,411,514 B1 * 6/2002 Hussaini ................. 165/104.33

* cited by examiner

Primary Examiner—Sandra O'Shea
Assistant Examiner—Mark Tsidulko
(74) Attorney, Agent, or Firm—Rosenberg, Klein & Lee

(57) ABSTRACT

A circuit board indicator comprises a plurality of lamps with cut and bent terminals, an outer plastic holder and an inner plastic holder. The outer plastic holder contains an accommodating chamber, which has a plurality of rounded holes on a lateral side thereof. The inner plastic holder has a plurality of positioning recesses and each of the positioning recesses has a guiding slot on topside thereof. The terminals of the lamps are guided by the guiding slot and inserted into corresponding positioning recesses. The inner plastic holder further has a plurality of clamping dents to clamp corresponding lamps. The inner plastic holder has barbs on two lateral sides thereof and corresponding to rectangular grooves on the outer plastic holder. The barbs are engaged into corresponding rectangular grooves when the inner plastic holder is assembled to the outer plastic holder.

9 Claims, 5 Drawing Sheets

CIRCUIT BOARD INDICATOR

FIELD OF THE INVENTION

The present invention relates to a circuit board indicator, especially to a circuit board indicator with simple process and enhanced productivity.

BACKGROUND OF THE INVENTION

The circuit board indicator (CBI) is a device incorporating lamps on a plastic holder and extensively used for circuit board with indication lamps such as computer mainframe, optical disk driver, network card, monitor, modem, set-top box, and hub.

FIGS. 1 and 2 show the schematic views of a prior art circuit board indicator. The prior art circuit board indicator mainly comprises an outer plastic holder 60, an inner plastic holder 70 and a plurality of lamps 80 each having terminals 85. The outer plastic holder 60 has a plurality of mounting holes 65 through a first lateral side thereof. The inner plastic holder 70 is assembled to a second lateral side of the outer plastic holder 60 adjacent to the first lateral side. The terminals 85 of the lamp 80 pass through the mounting holes 65 and are then subjected to cutting and bending process. The cut and bent ends of the terminals 85 are assembled into the inner plastic holder 70.

However, in above-mentioned circuit board indicator, the terminals 85 of the lamp 80 firstly pass through the mounting holes 65 on one lateral side of the outer plastic holder 60 and then each of the terminals 85 is processed individually. More particularly, the terminals 85 of the lamp 80 generally have different specifications. Therefore, cutting and bending apparatus with different specifications are required to process the terminals 85 of the lamp 80.

As can be seen from above description, the above-mentioned circuit board indicator has cumbersome manufacture process and requires considerable amount of cutting and bending apparatus. More particular, the above-mentioned circuit board indicator has following drawbacks:

1. The lamps are individually mounted; this is cumbersome and labor consuming.
2. The lamps with terminals of different specifications need cutting and bending apparatus with different specifications.
3. The circuit board indicators should be manufactured through production line and cannot be made in separated way.

SUMMARY OF THE INVENTION

It is the object of the present invention to provide a circuit board indicator with simple process and enhanced productivity.

In one aspect of the present invention, the circuit board indicator of the present invention comprises a plurality of lamps, an outer plastic holder and an inner plastic holder. The outer plastic holder contains an accommodating chamber, which has a plurality of rounded holes on a lateral side thereof. The inner plastic holder has a plurality of positioning recesses and each of the positioning recesses has a guiding slot on topside thereof. The terminals of the lamps are guided by the guiding slot and inserted into corresponding positioning recesses. The inner plastic holder further has a plurality of clamping dents to clamp corresponding lamps. The inner plastic holder has barbs on two lateral sides thereof and corresponding to rectangular grooves on the outer plastic holder. The barbs are engaged into corresponding rectangular grooves when the inner plastic holder is assembled to the outer plastic holder.

In another aspect of the present invention, the lamps have already cut and bent terminals. The specification of the cutting and bending apparatus can be unified.

The various objects and advantages of the present invention will be more readily understood from the following detailed description when read in conjunction with the appended drawing, in which:

DETAILED DESCRIPTION OF THE INVENTION

Figure 1:
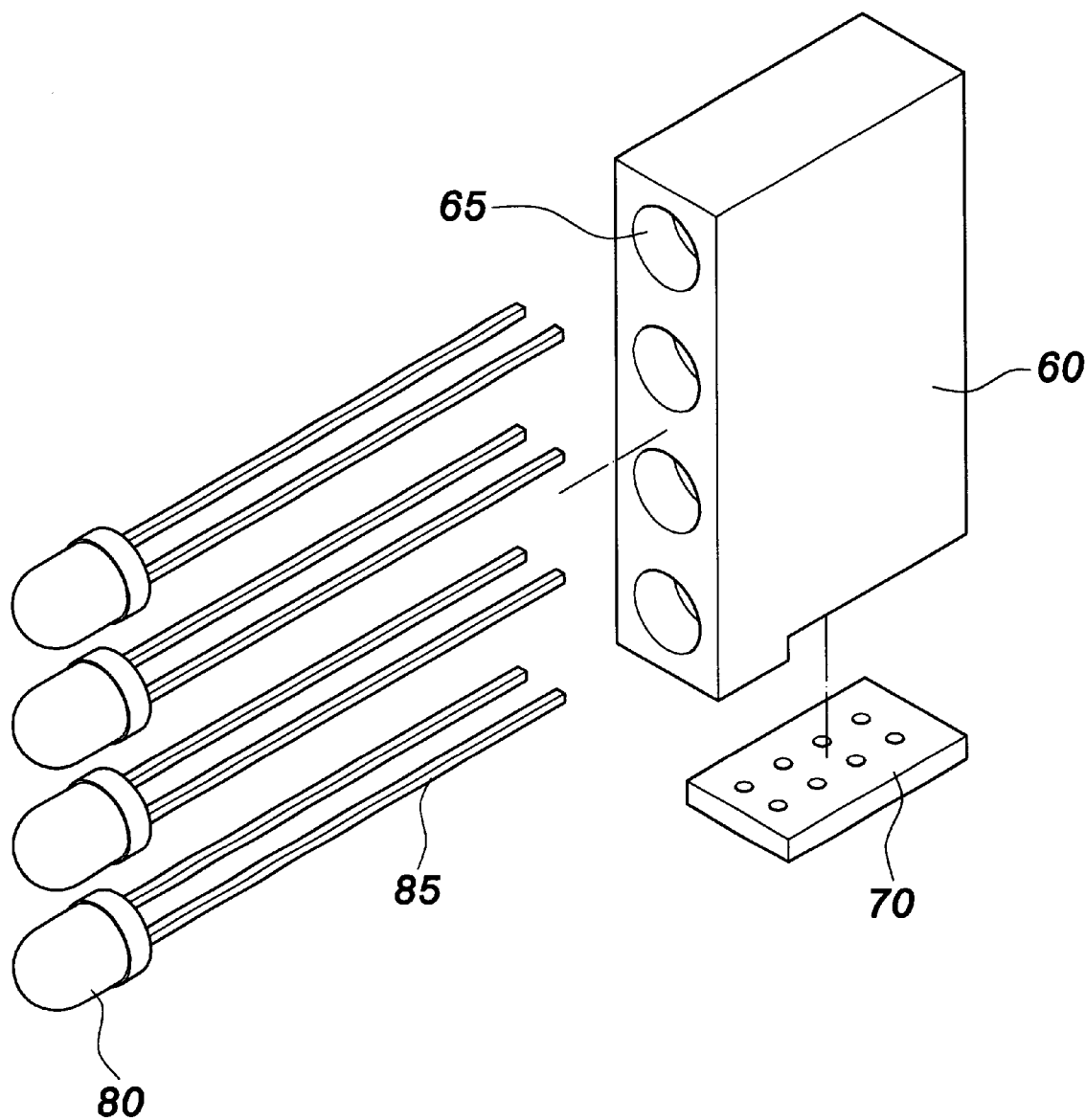
FIG. 1 shows an exploded view of a prior art circuit board indicator.
Figure 2:
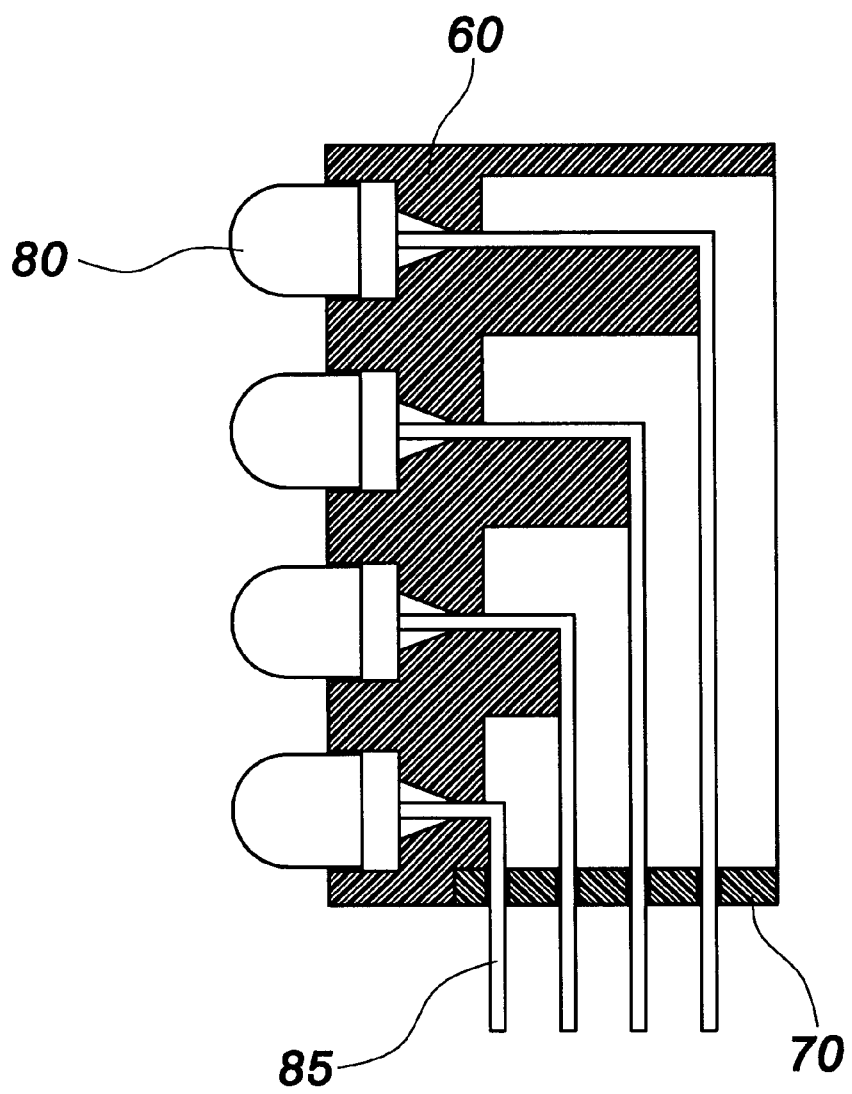
FIG. 2 shows a sectional view of a prior art circuit board indicator.
Figure 3:
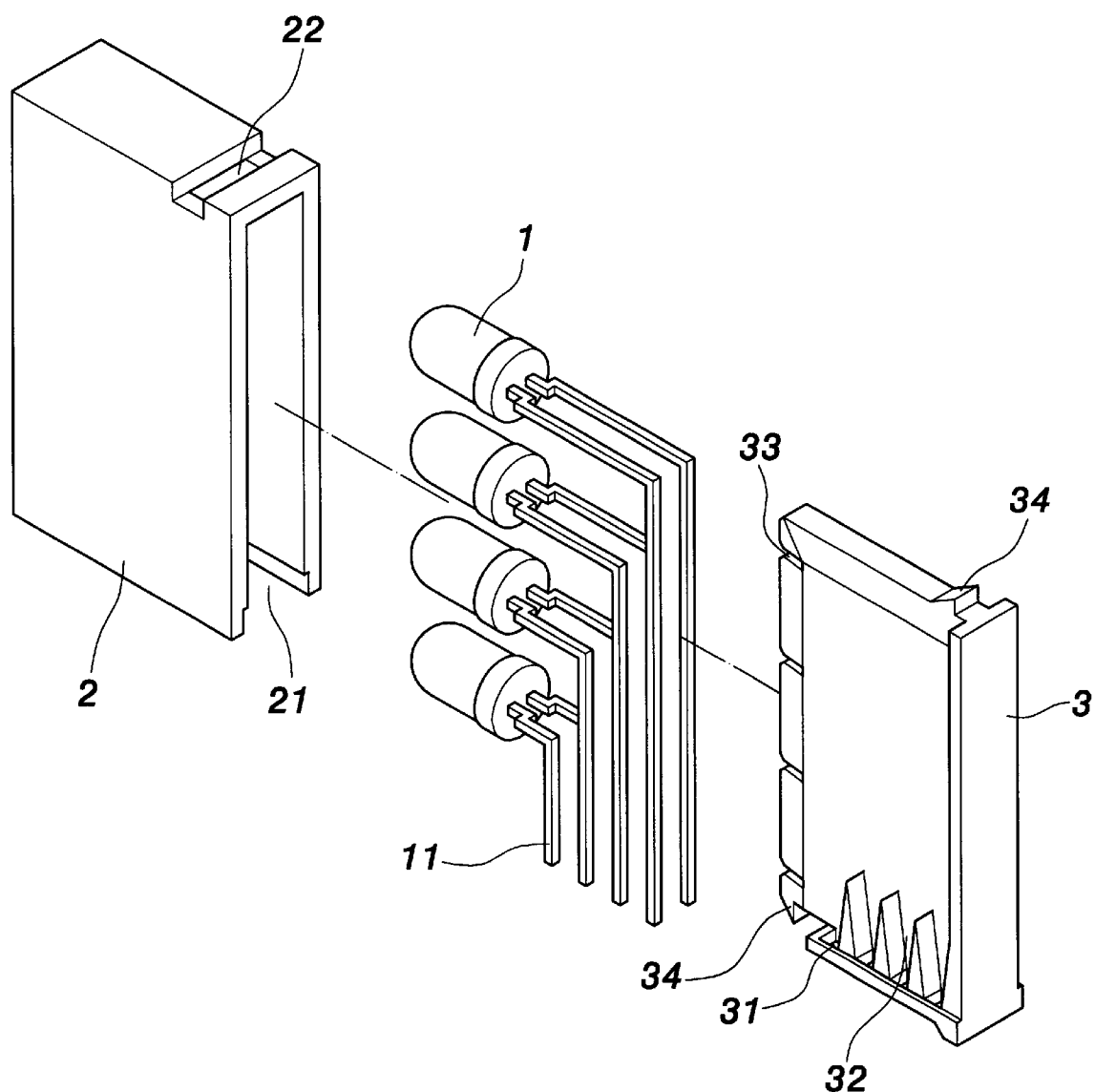
FIG. 3 shows an exploded view of the circuit board indicator of the present invention.
Figure 4:
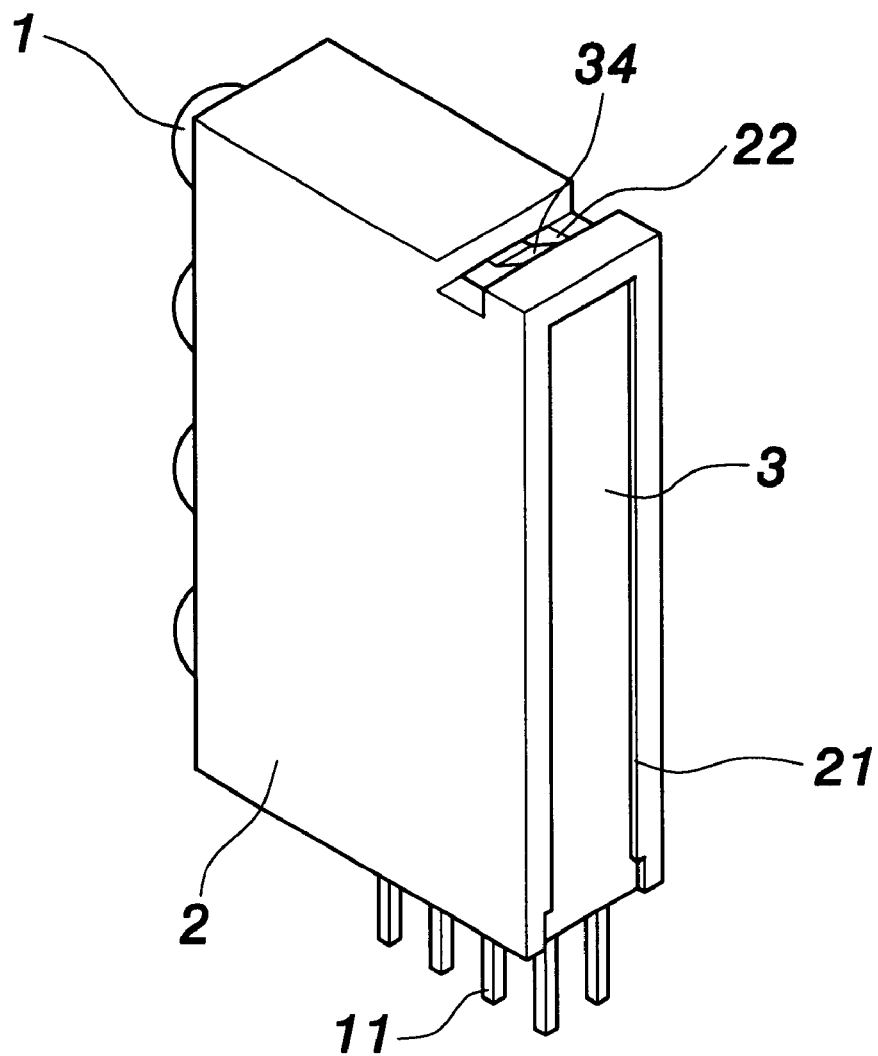
FIG. 4 shows a perspective view of the circuit board indicator of the present invention.
Figure 5:
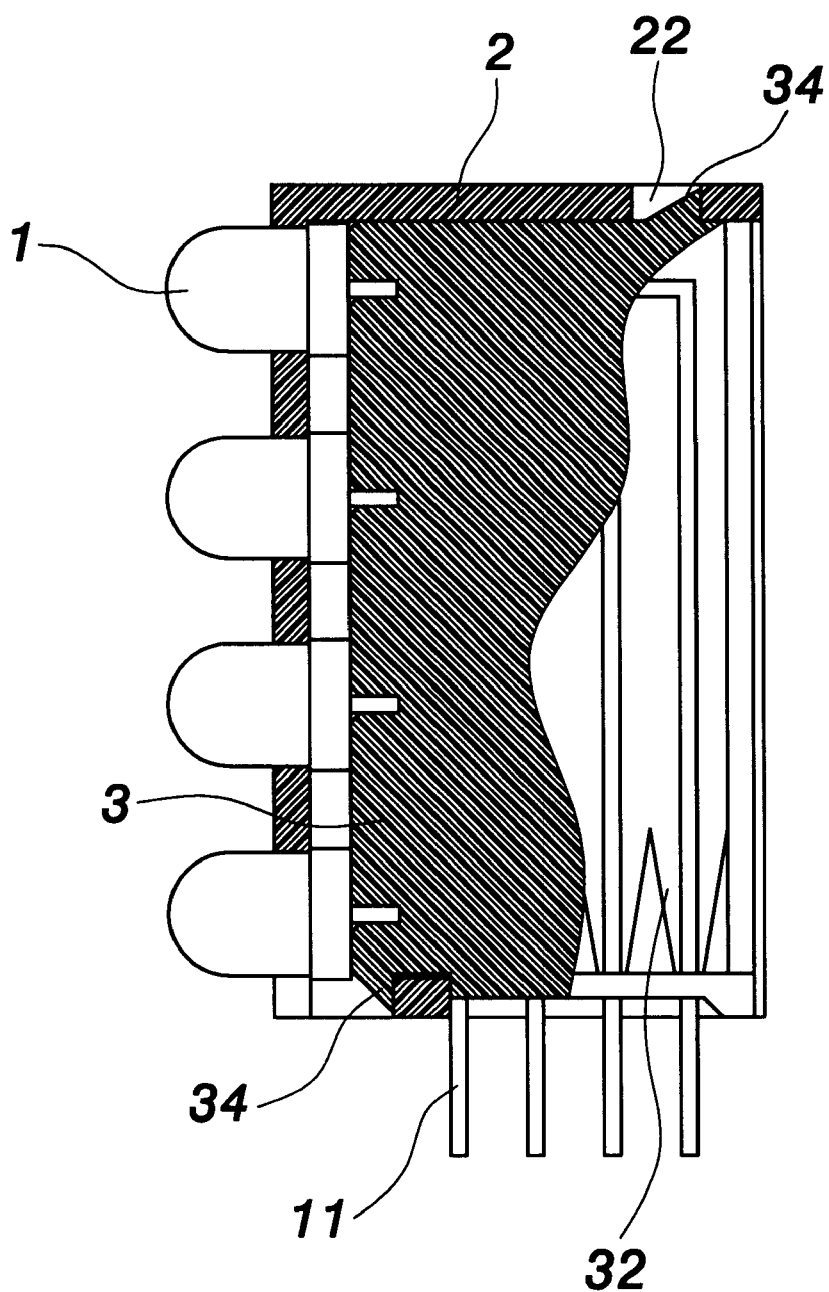
FIG. 5 shows a sectional view of the circuit board indicator of the present invention.

With reference now to FIGS. 3 to 5, the present invention provides an improved circuit board indicator. The circuit board indicator comprises a plurality of lamps 1 with already cut and bent terminals, an outer plastic holder 2 and an inner plastic holder 3.

The outer plastic holder 2 contains an accommodating chamber 21 therein and the accommodating chamber 21 has a plurality of rounded holes (not shown) on one lateral side. The lamps 1 are assembled into the accommodating chamber 21 and emit light through the rounded holes. In the preferred embodiment of the present invention, there are four rounded holes corresponding to four lamps. The outer plastic holder 2 has two rectangular grooves 22 on two lateral sides adjacent to the accommodating chamber 21.

The inner plastic holder 3 has a plurality of positioning recesses 31 on two lateral bottom portions thereof. Each of the positioning recesses 31 has a guiding slot 32 thereon. The terminals 11 of the lamps 1 are guided by the guiding slot 32 and inserted into the positioning recesses 31. The inner plastic holder 3 further has a plurality of clamping dents 33 on a front side thereof to clamp corresponding lamps 1. The inner plastic holder 3 further has two barbs 34 on two lateral sides adjacent to the clamping dents 33. The barbs 34 are engaged into the two rectangular grooves 22 when the inner plastic holder 3 is assembled into the accommodating chamber 21 of the outer plastic holder 2.

To assemble the inventive circuit board indicator, the cut and bent terminals 11 of the lamps 1 are guided by the guiding slot 32 and inserted into the positioning recesses 31. The lamps 1 are then clamped by the clamping dents 33 of the inner plastic holder 3. Afterward, the inner plastic holder 3 mounted with the lamps 1 is assembled to the outer plastic holder 2 and retained by the engagement of the barbs 34 and the two rectangular grooves 22. The inner plastic holder is assembled to the outer plastic holder by ultrasonic join or pressing.

To sum up, the inventive circuit board indicator has following advantages:

1. The manufacture process is simplified and the productivity is enhanced by at least 20%. The manufacture process is simplified due to simple structure of the outer plastic holder, mounting function of the inner plastic holder, and beforehand cut and bent terminals.
2. The process can be standardized.
3. The specification of the cutting and bending apparatus can be unified.
4. The manufacture process can be made in separated way and part of the components can be made in advance.
5. The quality control can be realized by ejecting defected component rather than ejecting finished product.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A circuit board indicator comprising:
    (a) an outer holder having an outer wall portion defining an accommodating chamber;
    (b) an inner holder coupled to said outer holder, said inner holder having a central wall portion coupled to a base portion, said central wall portion including a leading edge section transversely extending relative to said base portion, said leading edge section having a plurality of clamping dents formed therein, said base portion having a plurality of first and second positioning recesses, said first and second positioning recesses being disposed on opposing sides relative to said central wall portion; and,
    (c) a plurality of lamps coupled to said inner holder for capture thereby substantially within said accommodating chamber of said outer holder, said lamps being disposed along said leading edge section, each said lamp having a pair of preconfigured terminals extending therefrom to straddle said central wall portion of said inner holder and respectively engage paired ones of said first and second positioning recesses, a portion of each said terminal engaging one said clamping dent of said central wall portion.

2. The circuit board indicator as recited in claim 1 wherein said first and second positioning recesses are disposed respectively adjacent a plurality of guiding slots defined on said central wall portion.

3. The circuit board indicator as recited in claim 2 wherein each said guiding slot being defined at least partially by a wedge shaped protrusion extending from said central wall portion of said inner holder.

4. The circuit board indicator as recited in claim 1 wherein said terminals of said lamps each include an L-shaped bend, said L-shaped bend of each said terminal engaging said clamping dent of said inner holder central wall portion.

5. The circuit board indicator as recited in claim 1 wherein said outer wall portion of said outer holder has formed thereon at least one rectangular groove.

6. The circuit board indicator as recited in claim 5 wherein said inner holder has protruding therefrom at least one barb retentively engaging said rectangular groove of said outer holder outer wall portion.

7. The circuit board indicator as recited in claim 1 wherein said inner and outer holders are each formed of a plastic material.

8. The circuit board indicator as recited in claim 1 wherein said inner and outer holders are fastened at an ultrasonic joint.

9. The circuit board indicator as recited in claim 1 wherein said inner and outer holders are fastened at a pressed joint.

* * * * *